(12) United States Patent
Yilmaz et al.

(10) Patent No.: US 11,196,505 B2
(45) Date of Patent: Dec. 7, 2021

(54) METHOD AND APPARATUS FOR OPTICAL POWER CONTROLS IN OPTICAL NETWORKS

(71) Applicant: Infinera Corporation, Sunnyvale, CA (US)

(72) Inventors: Omer F. Yilmaz, Palo Alto, CA (US); Jonathan M. Buset, San Jose, CA (US); Xian Xu, San Francisco, CA (US); Changyu Lin, Sunnyvale, CA (US); Steve Sanders, Los Altos, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/683,017

(22) Filed: Nov. 13, 2019

(65) Prior Publication Data
US 2020/0153533 A1 May 14, 2020

Related U.S. Application Data

(60) Provisional application No. 62/760,072, filed on Nov. 13, 2018.

(51) Int. Cl.
*H04B 10/296* (2013.01)
*H04J 14/02* (2006.01)
*H04B 10/564* (2013.01)

(52) U.S. Cl.
CPC ........ *H04J 14/0221* (2013.01); *H04B 10/296* (2013.01); *H04B 10/564* (2013.01); *H04J 14/021* (2013.01); *H04J 14/0201* (2013.01)

(58) Field of Classification Search
None
See application file for complete search history.

(56) References Cited

U.S. PATENT DOCUMENTS

| 6,728,484 | B1 * | 4/2004 | Ghani | H04J 14/0227 |
| | | | | 385/50 |
| 7,046,929 | B1 * | 5/2006 | Hester | H04B 10/0771 |
| | | | | 398/1 |
| 7,822,345 | B2 * | 10/2010 | Furst | H04J 14/0221 |
| | | | | 398/94 |
| 7,826,746 | B2 * | 11/2010 | Stango | H04J 14/0221 |
| | | | | 398/79 |
| 9,215,029 | B2 * | 12/2015 | Han | H04J 14/0269 |

(Continued)

*Primary Examiner* — Li Liu
(74) *Attorney, Agent, or Firm* — David L. Soltz (57) ABSTRACT

An optical network and a method are described. In the method, an orchestrator of an optical communication system receives an operation to execute, the operation being to activate or deactivate a service within a transmission signal of the optical communication system, the optical communication system having a span and an amplifier coupled to and supplying optical signals into each span. Network status data for each span within the optical communication system is retrieved, and the list of operations is analyzed with the network status data including existing data traffic on the fiber optic line to select a subset of the list of operations to execute that maintains the transmission signal below a bit error rate threshold. The orchestrator issues one or more signals to cause the one or more service within the subset of the list of operations to be activated or deactivated on the optical communication system.

17 Claims, 7 Drawing Sheets

(56) References Cited

U.S. PATENT DOCUMENTS

| | | | | |
|---|---|---|---|---|
| 9,515,734 | B2* | 12/2016 | Kim | H04B 10/2557 |
| 2001/0017729 | A1* | 8/2001 | Sugaya | H01S 3/06758 |
| | | | | 359/341.41 |
| 2002/0109879 | A1* | 8/2002 | Wing So | H04J 14/0241 |
| | | | | 398/58 |
| 2005/0089027 | A1* | 4/2005 | Colton | H04Q 11/0005 |
| | | | | 370/380 |
| 2006/0263089 | A1* | 11/2006 | Furst | H04J 14/0297 |
| | | | | 398/79 |
| 2007/0258714 | A1* | 11/2007 | Little | H04J 14/0219 |
| | | | | 398/76 |
| 2011/0135301 | A1* | 6/2011 | Myslinski | H04J 14/0201 |
| | | | | 398/34 |
| 2013/0236169 | A1* | 9/2013 | Gaudette | H04B 10/0795 |
| | | | | 398/25 |
| 2017/0085316 | A1* | 3/2017 | Al Sayeed | H04J 14/0201 |
| 2018/0123724 | A1* | 5/2018 | Zhang | H04J 14/0257 |
| 2018/0295588 | A1* | 10/2018 | Abdelmonem | H04W 36/20 |
| 2019/0109638 | A1* | 4/2019 | Yilmaz | H04L 45/64 |

* cited by examiner

METHOD AND APPARATUS FOR OPTICAL POWER CONTROLS IN OPTICAL NETWORKS

INCORPORATION BY REFERENCE

The present patent application hereby claims priority to the provisional patent application identified by U.S. Ser. No. 62/760,072 filed on Nov. 13, 2018, the entire content of which is hereby incorporated by reference.

BACKGROUND

Optical networking is a communication means that utilizes signals encoded in light to transmit information in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Optical networks include both free-space optical networks and fiber optic networks. Free-space networks transmit signals across open space without the use of a specific medium for the light. An example of a free-space optical network includes Starlink by SpaceX. A fiber-optic network, however, utilizes fiber optic cables made of glass fiber to carry the light through a network.

As the optical signal traverses the fiber optic cable, the signal may lose strength. Additionally, changes in channel loading, that is, the distribution of data across the signal wavelength, may cause a power transient that is amplified based on the number of line spans between terminals. If a set of services are loaded into the signal during a cycle, the services may cause a power transient that prevents the signal from carrying all data to an end terminal. In current optical network systems, when a user requests operations such as the activation or deactivation a group of one or more services, a ROADM at a head-end terminal of the fiber optic cable performs the operations as soon as possible. The quantity of channels added or removed from the signal due to the operations may cause a significant change in stimulated Raman scattering per span for any existing channels on the fiber optic cable, thereby leading to a power transient. The resulting power transient may lead to signal degradation that cannot be corrected, thus causing the existing channels to fail to maintain the signal until the next power control cycle, which may be hundreds of seconds later.

Thus, a need exists for a method and apparatus for optical power controls in optical networks to load channels as quickly as possible without causing a power transient that degrades the optical signal.

SUMMARY

The problem of loading channels as quickly as possible without causing a power transient that degrades a transmission signal is solved with the methods and systems described herein, including an orchestrator analyzing a list of operations with the network status data including existing data traffic on the fiber optic line to select a subset of the list of operations to execute that maintains the transmission signal below a bit error rate threshold. The orchestrator issues one or more signals to cause the one or more service within the subset of the list of operations to be activated or deactivated on the optical communication system.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another. The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

As used herein, a span is the spread or extent of a fiber optic cable between the fiber optic cables' terminals. Generally, a span is an unbroken or uninterrupted segment of fiber optic cable between amplifiers. For instance, if a fiber optic cable carried a signal from point A through a repeater or amplifier at point B and on to point C, the fiber optic cable is said to have two spans, a first span from A to B, and a second span from B to C, the length of the spans being the distance between the respective points. A span may also be the distance between amplifiers, even if the fiber optic cable has not been terminated. For example, the fiber optic cable may not be terminated at an optical in-line amplifier (described in detail below).

As used herein, a transmission line segment is the portion of a transmission line from a first node (e.g., ROADM) transmitting a transmission signal to a second node (e.g., ROADM) receiving the transmission signal. The transmission line segment may include one or more optical in-line amplifier situated between the first node and the second node.

Raman scattering, also known as spontaneous Raman scattering, is an inelastic scattering of photons by matter, that is, the direction and energy of the light changes due to an exchange of energy between photons and the medium. Inelastic scattering is a fundamental scattering process in which the kinetic energy of an incident particle is not conserved. Stimulated Raman scattering (SRS) takes place when a signal light interacts in a medium with a pump light (light source or original light), which increases the Raman-scattering rate beyond spontaneous Raman scattering. Signal-Signal Stimulated Raman Scattering is Raman scattering caused by the injection of two or more signal lights into a light stream. Raman gain, also known as Raman amplification, is based on stimulated Raman scattering wherein a lower frequency photon induces the inelastic scattering of a higher-frequency photon in an optical medium.

As used herein, gain is a process wherein the medium on which a transmission signal is traveling transfers part of its energy to the emitted signal, in this case the transmission signal, thereby resulting in an increase in optical power. In other words, gain is a type of amplification of the transmission signal.

Amplified spontaneous emission (ASE) is light produced by spontaneous emission that has been optically amplified by the process of stimulated emission in a gain medium. ASE is an incoherent effect of pumping a laser gain medium to produce a transmission signal. If an amplified spontaneous emission power level is too high relative to the transmission signal power level, the transmission signal in the fiber optic cable will be unreadable due to the low signal to noise ratio.

As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, tilt, also called linear power tilt, is defined as the linear change in power with wavelength over the signal spectrum. Due to Raman gain, short wavelength signals provide Raman gain for longer wavelengths. SRS Tilt strength, that is the difference in gain between the longest wavelength and the shortest wavelength of the signals, depends on the transmission signal power, spectral loading, fiber type, and fiber length. As used herein, the tilt arises from power that is depleted from shorter wavelength signals to amplify longer wavelength signals.

Spectral loading is the addition of one or more channel to a specific spectrum of light described by the light's wavelength. When all channels within a specific spectrum are being utilized, the specific spectrum is described as fully loaded.

Figure 1:
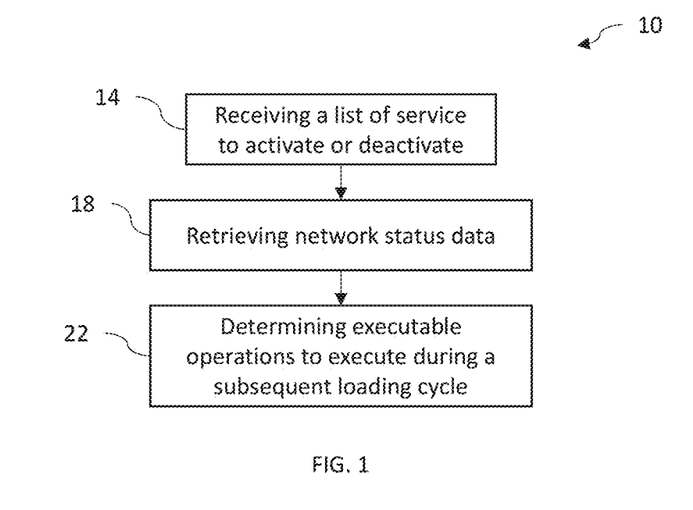
FIG. 1 is a process flow diagram of an exemplary embodiment of a channel loading method in an optical network.

Referring now to the drawings, and in particular to FIG. 1, shown therein is a process flow diagram of channel loading method 10. The channel loading method 10 generally comprises: receiving a list of operations to execute (step 14); retrieving network status data (step 18); and determining executable operations to execute during a subsequent loading cycle (step 22).

In one embodiment, the step of receiving a list of operations to execute (step 14) is performed by an orchestrator. In one embodiment, the orchestrator is a computer, or microprocessor, that is in communication with a power controller, that may be in communication with at least one other orchestrator, and that executes control over one or more reconfigurable optical add drop multiplexer (ROADM) and one or more optical in-line amplifier. The list of operations to execute may be provided by a user through a user interface 86 described below, or may be provided by a computer or microprocessor, including another orchestrator. The list of operations to execute may be described as a list of operations to perform, each operation being either activating or deactivating a service on a specific channel. Activating or deactivating a service may comprise one or more operation.

In one embodiment, the step of retrieving network status data (step 18) is performed by the orchestrator. Network status data may include span information, transmission launch power information, and equipment definitions, such as from a ROADM or an optical in-line amplifier (ILA). Span information describes one or more spans between either a ROADM and an ILA or between two ILAs and may include fiber optic line material properties, such as gain per distance, fiber optic line distance between amplifiers, and/or current spectral status of the transmission signal. Transmission launch power may include the spectral power, usually described in decibels (dB), of the transmission signal after each transmitter or amplifier. The network status data may be reported to the local orchestrator through the power controller 46, described below, or the ROADM 62, described below.

In one embodiment, the step of determining executable operations to execute during a subsequent loading cycle (step 22) includes computing the current spectral load of the transmission signal based at least in part on network status data, calculating potential spectral loading change for each service, and determining whether each service can be loaded based in part on automated loading policies, the current spectral load of the transmission signal, and the potential spectral loading change for that particular service. Adding and/or removing optical channels creates a power transient, and thus changes the amount of tilt in each span. In order to determine whether each service can be loaded, an estimate of the transient power's impact due to loading the particular service on the existing channels in the transmission signal for each requested service is performed. The estimate of the transient power's impact on the existing channels in the transmission signal is then compared to the automated loading policies such that the list of potential services is filtered to minimize power transients in the transmission line segment as maintain sufficient performance to minimize traffic interruptions.

Figure 2:
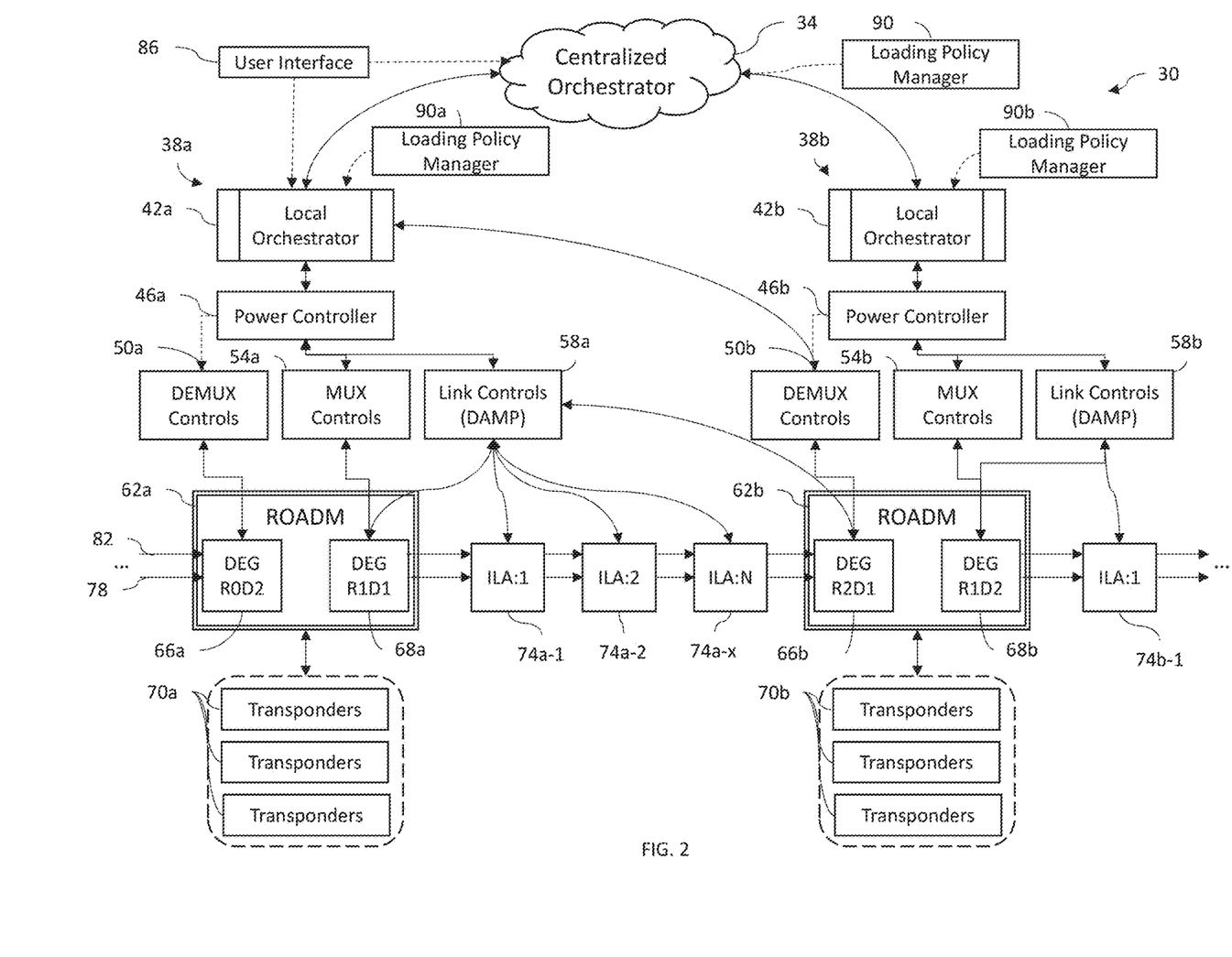
FIG. 2 is a diagram of an exemplary embodiment of a centrally orchestrated optical controller in an optical network.

Referring now to FIG. 2, shown therein is a centrally orchestrated optical network 30 comprising a centralized orchestrator 34, a first optical controller 38a and a second optical controller 38b. The first optical controller 38a comprises a local orchestrator 42a, a power controller 46a, a DEMUX controller 50a, a MUX controller 54a, a link controller 58a, a ROADM 62a having a receive Degree 66a and a transmit degree 68a, and a plurality of transponders 70a. Similarly, the second optical controller 38b comprises a local orchestrator 42b, a power controller 46b, a DEMUX controller 50b, a MUX controller 54b, a link controller 58b, a ROADM 62b having a receive degree 66b and a transmit degree 68b, and a plurality of transponders 70b. The centralized orchestrator 34 and/or the one or more local orchestrator 42 are accessible via a user interface 86. The centrally orchestrated optical network 30 may be a wavelength division multiplexed optical communication system.

In one embodiment, the local orchestrator 42a generally controls the operations of the power controller 46a, which in turn executes control over the MUX controller 54a and the link controller 58a by providing new data to the transmit degree 68a through the MUX controller 54a, the new data being data representing services from the second list, or amplification data to the transmit degree 68a and one or more ILA 74a through the link controller 58a. The power controller 46a determines how the link controller 58a manages amplifier gain settings and amplifier tilt settings. By controlling the transmit degree 68a, the local orchestrator 42a causes the data signal to be modified to include new services or to remove services currently in place. The fiber line 78 and the fiber line 82 have one or more span and extend between one or more ROADM 62. As shown in FIG. 2, the fiber line 82 and the fiber line 78 span between the transmit degree 68a and ILA 74a-1 and continue to span between one or more ILA 74a before a last span that terminates at the receive degree 66b of ROADM 62b. Each of the ILA 74a between the ROADM 62a and the ROADM 62b are controlled by the link controller 58a. The link controller 58a also controls the transmit degree 68a and the receive degree 66b. By controlling the transmit degree 68a and the receive degree 66b as well as every ILA 74a therebetween, the link controller 58a can adjust the power for each channel to account for and mitigate the tilt of each span. Each ILA may be subject to distributed line system amplifier gain and tilt controls by the link controller 58a. The link controller 58a sets the amplifier gain settings to bring output power of the ILA 74 to a preferred level. The link controller 58a determines the appropriate gain settings based on input power of the ILA 74, channel count in the transmission signal, and amplified spontaneous emission (AES) noise. The link controller 58a sets the amplifier tilt settings to correct tilt that occurs in the preceding span. The link controller 58a calculates the expected tilt of a span based on launch power, spectral loading, fiber type, and fiber length. A tilt correction signal amplification to compensate for the preceding span tilt is applied by each amplifier. Depending on the fiber type and launch powers, linear power tilt up to 8 dB per span, that is, a linear tilt slope of 0.81 dB/THz per span, can be expected. Refined policies based on SRS tilt measurements enable accurate tilt compensation in each span.

In one embodiment, the link controller 58 communicates the network status data to the transmit degree 68, the one or more ILA 74 and the receive degree 66 via an optical supervisory channel (OSC) 121 (described below). The optical supervisory channel 121 may be an optical link between the link controller 58, the transmit degree 68, the one or more ILA 74, and the receive degree 66.

In one embodiment, the centralized orchestrator 34 is running in the cloud, that is, the centralized orchestrator is running on one or more computers accessible via the internet and in communication with the one or more local orchestrator 42. In another embodiment, the centralized orchestrator 34 is a local orchestrator 42 having control over all or a predetermined subset of other local orchestrators 42.

In one embodiment, each of the one or more local orchestrators 42 can only access information on the transmission line segment of which the transmit Degree 66 an element under the control of the local orchestrator 42 and cannot share information it has gathered with another orchestrator 42. In other embodiments, the local orchestrator 42 may share traffic dependency information with one or more other local orchestrators 42.

In one embodiment, the centralized orchestrator 34 can receive information from each of the one or more local orchestrators thereby allowing the centralized orchestrator 34 to orchestrate operations between each of the one or more local orchestrators. Additionally, centralized orchestrators 34, when connected to a first network, can orchestrate operations between one or more local orchestrators also connected to the first network.

In one embodiment, the centralized orchestrator 34 and the one or more local orchestrators 42 may be accessed by the user interface 86. The user interface 86 provides a user access to a set of operations to perform on a particular transmission line segment. The set of operations may include operations to activate or deactivate a specific service. The set of operations to be performed, is passed to the centralized orchestrator 34 or the local orchestrator 42 where the newly added operations are added to a list of pending operations. The centralized orchestrator 34 or the local orchestrator 42, having a list of pending operations, sends the list of pending operations to a loading policy manager 90. The loading policy manager 90 has a plurality of policies, each policy being an algorithm used to calculate the impact of executing a specific operation on the power level and tilt of the transmission signal across all bands. The loading policy manager 90, by evaluating operations in the list of pending operations, determines a set of executable operations to perform in the next cycle in order to minimize the effect on the existing transmission signal. The set of executable operations may be organized in a specific order in which the operations must be executed. Additionally, the set of executable operation may be a subset of operations in the list of pending operations. The loading policy manager 90 provides the set of executable operations to the requesting orchestrator. If the requesting orchestrator is the centralized orchestrator 34, the centralized orchestrator 34 will send the set of executable operations to each local orchestrator 42 per the requirements of the set of executable operations. Each local orchestrator 42 may perform additional checks with the loading policy manager 90 or may pass the set of executable operations on to the power controller 46. If the requesting orchestrator is the local orchestrator 42, the local orchestrator 42 passes the set of executable operations to the power controller 46, and, if the set of executable operations includes operations for components not under the control of the local orchestrator 42, the local orchestrator 42 may send the set of executable operations to the pertinent local orchestrator 42 or to the centralized orchestrator 34. The power controller 46, having received a set of executable operations, then executes the set of executable operations on the transmission line segment to generate data to configure the MUX controller 54*a* and the link controller 58*a*.

Once the transmission line segment has active traffic, the loading policy manager 90 may be the primary mechanism to minimize tilt and average power changes during controlled operations. In one embodiment, the loading policy manager 90 evaluates the list of pending operations using both static data and dynamic data. The static data and dynamic data may include C-Band status, L-Band status, a list of active services, fiber span data for each span in the transmission line segment, equipment topology, and carrier wavelengths, also known as carrier locations. Fiber span data may include fiber type, fiber length, transmit launch power target per band, ILA 74 equipment compositions, and terminal compositions, such as ROADM compositions. In one embodiment, the user may define and/or select one or more of the plurality of policies in the loading policy manager 90. For example, a link with more margin may support aggressive, that is, faster policies, while a link with a lower margin may require conservative, or slower, policies. A policy that supports activating a larger number of channels than a second policy is said to be an aggressive policy whereas the second policy is said to be a conservative policy, in other words, the more aggressive a policy is, the larger the tilt generated by loading the selected policies. Differing operation types can use different policies. For example and not by way of limitation, during normal operations, the policy used to determine which services to load may minimize any impact on power level and tilt, such as by loading fewer services at once; however, during optical restoration operations, that is, when restoring from a full network failure, the policy used to determine which services to load may prioritize restoring all channels as fast as possible, thereby permitting some traffic loss.

The transponder 70 receives an electrical input signal and submits that input signal to the ROADM to be multiplexed and included into the transmission signal. The transponder 70 also receives an output signal from the ROADM, after the ROADM has demultiplexed the output signal, and provides a point to which an external component can attach to read the output signal. Transponders 70 have a maximum bit error rate above which the forward error correction does not give error free frames, known as an FEC threshold. Forward error correction is a method of obtaining error control in data transmissions in which the transmitter sends redundant data and the receiver recognizes only the portion of the data that contains no apparent errors. If the bit error rate of the data at the transponders exceeds the FEC threshold, the data is corrupted and unusable. In order to ensure that any changes in the transmission signal will not cause the bit error rate to exceed the FEC threshold, the loading policy manager 90 maintains a Quality Margin, or Q-Margin. The Q-margin at the end of a transmission line segment may be used to refine the policies within the loading policy manager 90. In some embodiments, the Q-margin may be as low as 0.5 dB to 1.0 dB for a transmission line segment with full link loading. The loading policy manager 90, when selecting operations to execute during the next cycle, determines which of the operations may be completed in a current activation/deactivation cycle without causing the Q-margin of one or more channel on the transmission signal to fall below the FEC threshold. The Q-margin and/or FEC threshold may be predetermined based on the network design. Any operations not selected during the current activation/deactivation cycle may be added to a list of pending operations for a subsequent, e.g., next, activation/deactivation cycle. This is the case of normal service operations. However, if operation speed is given priority over Q-margin, such as in optical restoration, the Q-margin may be exceeded.

The MUX controller 54a controls the multiplexer operations within the transmit degree 68a, thereby controlling what channels are utilized to form the transmission signal. The MUX controller 54a may receive data from one or more transponder 70a and multiplex that data with data already within the transmission signal depending on the commands from the power controller 46a. The DEMUX controller 50a controls the demultiplexer operations of the degree 66a, such as the decoding of one or more channels from the transmission signal and transmitting those channels either for further processing within the ROADM 62a or transmitting those channels to the one or more transponders 70a. The DEMUX controller 50b is controlled by the first optical controller 38a as the demultiplexer in the transmission line segment is the last component of any particular transmission line segment. Because each transmission line segment is controlled by a local orchestrator, the demultiplexer within the ROADM 62b of the second optical controller 38b is controlled by the local orchestrator 42a of the first optical controller 38a. In another embodiment, the demultiplexer within the ROADM 62b of the second optical controller 38b is controlled by the local orchestrator 42b.

The transmit degree 66a includes transmitters, each of which supplies an amplitude, BPSK, or QAM modulated optical signal or some combination thereof. Each optical signal may include multiple channels that are routed together, each channel may have one or more Nyquist subcarriers. The receive degree 68a includes receivers, each sensing or detecting a corresponding modulated optical signal and each performing optical clock and data recovery as well as FEC decoding of each modulated optical signal.

It should be noted that FIG. 2 shows only two ROADMs 62 comprising a single traffic direction of a single transmission line segment for brevity. The number of ROADMs 62, and thus the number of transmission line segments, may be dependent on the distance the transmission signal must travel. Additionally, the number of ILA 74a within the transmission line segment shown is limited to three for brevity, however, the number of ILAs 74 within a particular transmission line segment may be determined by the total geographic distance between each ROADM 62 and the fiber span loss that can be compensated for by each ILA 74.

Figure 3:
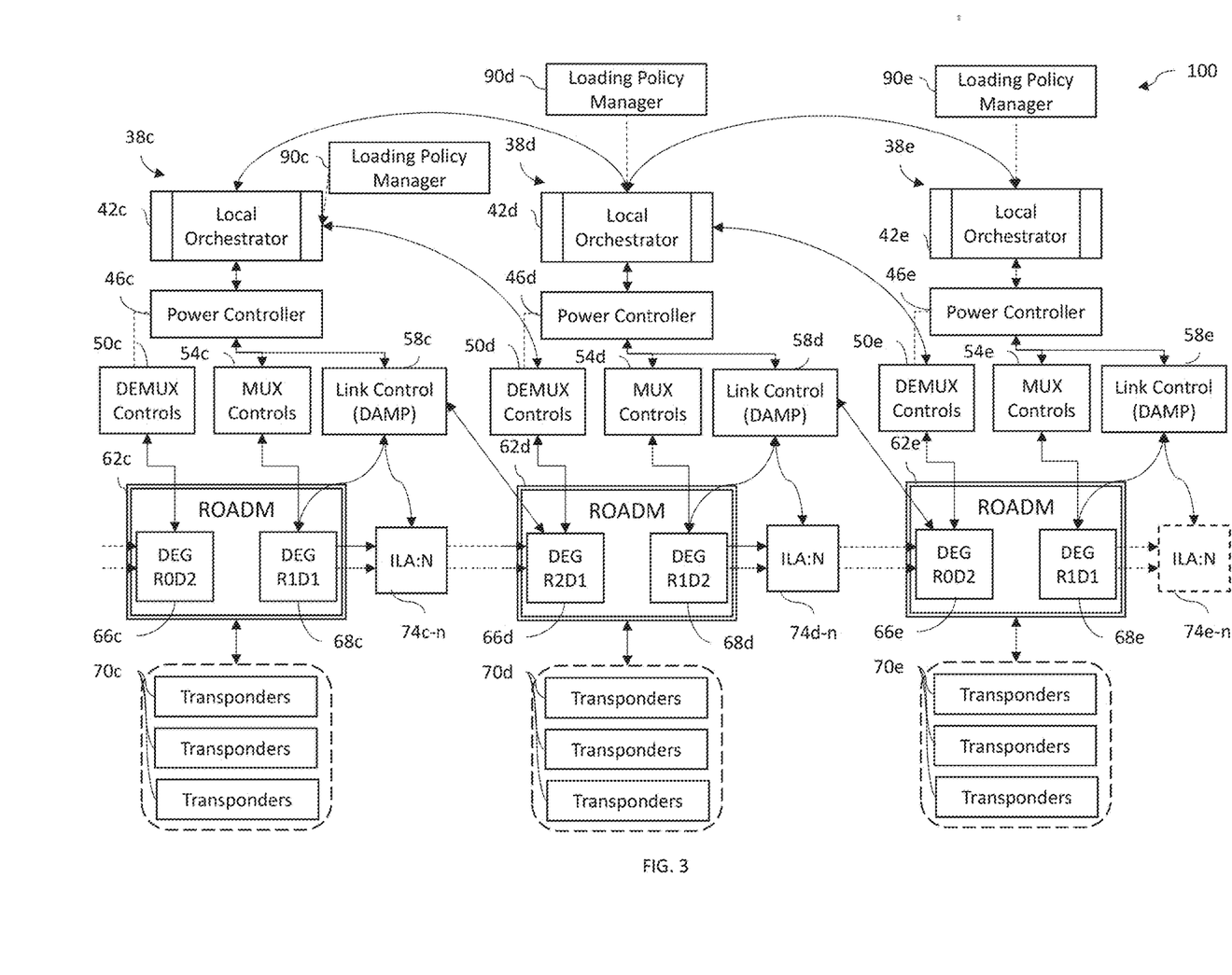
FIG. 3 is a diagram of an exemplary embodiment of a distributively orchestrated optical controller in an optical network.

Referring now to FIG. 3, shown therein is a distributively orchestrated optical network 100 comprising a third optical controller 38c, a fourth optical controller 38d, and a fifth optical controller 38e. Similar to the first optical controller 38a described above, the third optical controller 38c comprises a local orchestrator 42c, a power controller 46c, a DEMUX controller 50c, a MUX controller 54c, a loading policy manager 90c, and a link controller 58c, setting up and controlling a ROADM 62c having a receive degree 66c and a transmit degree 68c. A plurality of transponders 70c provide data into the ROADM 62c to transmit the data through the optical network 100 and/or receive data from the ROADM 62c. The fourth optical controller 38d comprises a local orchestrator 42d, a power controller 46d, a DEMUX controller 50d, a MUX controller 54d, a loading policy manager 90d, and a link controller 58d setting up and controlling a ROADM 62d having a receive degree 66d and a transmit degree 68d. A plurality of transponders 70d provide data into the ROADM 62d to transmit the data through the optical network 100 and/or receive data from the ROADM 62d. The fifth optical controller 38e comprises a local orchestrator 42e, a power controller 46e, a DEMUX controller 50e, a MUX controller 54e, a loading policy manager 90e, a link controller 58e, a ROADM 62e having a receive degree 66e and a transmit degree 68e, and a plurality of transponders 70e. The one or more local orchestrator 42 are accessible via a user interface 86, not shown. In one embodiment, each optical controller 38c, 38d and 38e includes a loading policy manager 90, whereas, in another embodiment, the loading policy manager 90 is shared in common between all local orchestrators 42c, 42d and 42e.

Generally, the operation of the distributively orchestrated optical network 100 is similar to the operation of the centrally orchestrated optical network 30, however, upon receipt of the executable operations from the loading policy manager 90, each local orchestrator 42 may send all executable operations for the transmission line segment over which that particular local orchestrator 42 can execute control to its respective power controller 46 and send a request to neighboring orchestrators having a list of executable operations for a transmission line segment over which the particular orchestrator cannot execute control.

In one embodiment, when the local orchestrator 42d, for example, receives executable operations from either local orchestrator 42c or local orchestrator 42e, the local orchestrator 42d adds the executable operations to the list of pending operations, which is then submitted to the loading policy manager 90. In another embodiment, when the local orchestrator 42d receives executable operations from either local orchestrator 42c or local orchestrator 42e, the local orchestrator 42d executes the executable operations on the next cycle.

Figure 4A:
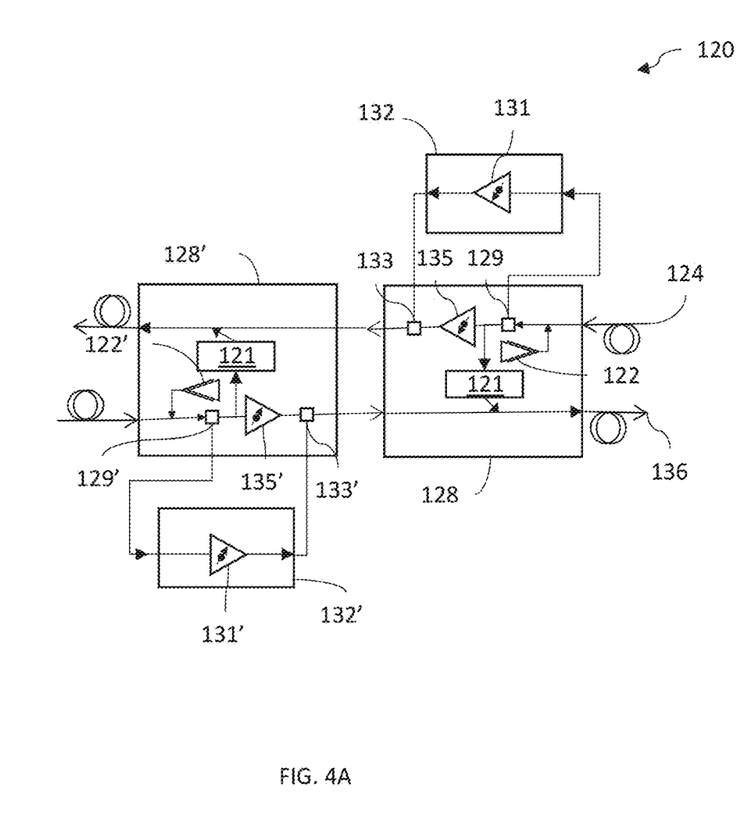
FIG. 4A is a diagram of an exemplary embodiment of a bidirectional hybrid C+L band amplifier.

It should be noted that FIG. 3 shows only three optical controllers 38, comprising two transmission line segments for brevity. The number of optical controllers 38, and thus the number of transmission line segments, may be dependent on the distance the transmission signal must travel. Additionally, the number of ILA 74 within each transmission line segment shown is limited to one for brevity, however, the number of ILAs 74 within a particular transmission line segment may be determined by the total geographic distance between each ROADM 62 and the fiber span loss that can be compensated for by each ILA 74. Referring now to FIG. 4A, shown therein is a first optical in-line amplifier 120. The first optical in-line amplifier 120 is a node and one type of optical in-line amplifier 74 as described above, and configured of erbium-doped fiber amplifiers (EDFA), at least one optical supervisory channel 121, and one or more Raman pump lasers 122. The first optical in-line amplifier 120 is coupled to a first fiber optic span 124 with a first transmission signal, having a C-Band portion and an L-Band portion, traveling in a first direction via the first fiber optic span 124, the first transmission signal being amplified by a Raman pump 122, the L-Band portion, split from the first transmission signal by a C+L Band WDM filter 129, passing through an L-Band erbium amplifier 131 within the L-Band card 132 then re-entering the hybrid C-Band card 128 and recombining, through a C+L Band WDM combiner 133, with the C-Band portion forming a first amplified transmission signal once the C-Band portion passes through a C-Band erbium amplifier 135. The first amplified transmission signal then passes through a hybrid C-Band card 128'. The first optical in-line amplifier 120 is further coupled to a second fiber optic span 136 with a second transmission signal, having a C-Band portion and an L-Band portion, traveling in a second direction, the second direction different than the first direction. The second transmission signal enters the hybrid C-Band card 128' coupled to the second fiber optic span 136 at the input port, the first transmission signal is then amplified by a Raman pump 122'. The L-Band portion, split from the first transmission signal by a C+L Band WDM filter 129', then passes through an L-Band erbium amplifier 131' within an L-Band card 132', re-enters the hybrid C-Band card 128' and is recombined at a C+L Band WDM combiner 133' with the C-Band portion forming a second amplified transmission signal once the C-Band portion passes through a C-Band erbium amplifier 135'. The second amplified transmission signal then passes through the hybrid C-Band card 128. In one embodiment, the Raman pump 122 may be more than one Raman pump 122.

Figure 4B:
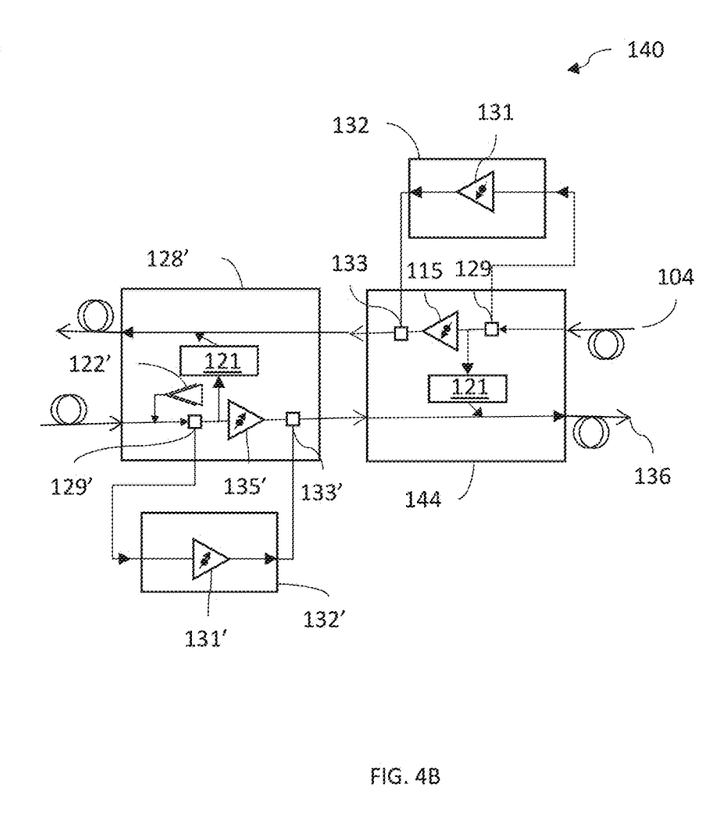
FIG. 4B is a diagram of an exemplary embodiment of a hybrid C+L band amplifier in a first direction and an erbium only C+L band amplifier in a second direction.

Referring now to FIG. 4B, shown therein is a second optical in-line amplifier 140. The second optical in-line amplifier 140 is a node and one type of optical in-line amplifier 74 as described above, configured of erbium-doped fiber amplifiers (EDFA), at least one optical supervisory channel 121, and a Raman pump 122'. The second optical in-line amplifier 140 is coupled to a first fiber optic span 124 with a first transmission signal, having a C-Band portion and an L-Band portion, traveling in a first direction, the L-Band portion, split from the first transmission signal by a C+L Band WDM filter 129, passing through an L-Band erbium amplifier 131 within the L-Band card 132 then re-entering the C-Band card 154 and recombining with the C-Band portion at a C+L Band WDM combiner 133, forming a first amplified transmission signal once the C-Band portion passes through a C-Band erbium amplifier 135. The first amplified transmission signal then passes through a hybrid C-Band card 128'. The second in-line amplifier 140 is further coupled to a second fiber optic span 136 with a second transmission signal, having a C-Band portion and an L-Band portion, traveling in a second direction, the second direction different than the first direction. The second transmission signal then being amplified by a Raman pump 122', the L-Band portion, split from the first transmission signal by a C+L Band WDM filter 129', passing through an L-Band erbium amplifier 131' within an L-Band card 132' then re-entering the hybrid C-Band card 128' and recombining with the C-Band portion at a C+L Band WDM combiner 133' forming a second amplified transmission signal once the C-Band portion passes through a C-Band erbium amplifier 115'. The second amplified transmission signal then passes through the C-Band card 144. In one embodiment, the Raman pump 122' may be more than one Raman pump 122'.

Referring back to FIG. 4A and FIG. 4B, the Raman pump is utilized to compensate for most of the tilt experienced in the previous span by increasing the overall gain of both the C+L Bands with the final tilt compensation being adjusted by the EDFA. Instructions are provided to set the EDFAs with different gain ranges to handle different tilts. The EDFA-L is designed with a specific gain range to handle tilt within the L-Band and the EDFA-C is designed with a specific gain range to handle tilt within the C-Band. Changes in tilt due to changes in channel loading require the link controller 58 to modify both tilt and gain settings of the optical in-line amplifiers. The link amplification may generate ASE, which is compensated for in determining the target output power of the EDFA.

While, for brevity, FIGS. 4A and 4B depict only two embodiments of configurations of C-Band cards 144, L-Band cards 132 and Hybrid C-Band Cards 128, it should be noted that other configurations may be used as well. For example, in FIG. 4B, the first signal passes through the C-band card 144 first and the hybrid C-Band card 128' second, however, another embodiment of an optical in-line amplifier may have the first signal passing through the hybrid C-Band card 128 first and then a C-Band card 144 second. Yet another embodiment may have the first signal passing through the C-Band card 144 first and then a second C-Band card 144' second.

Figure 5:
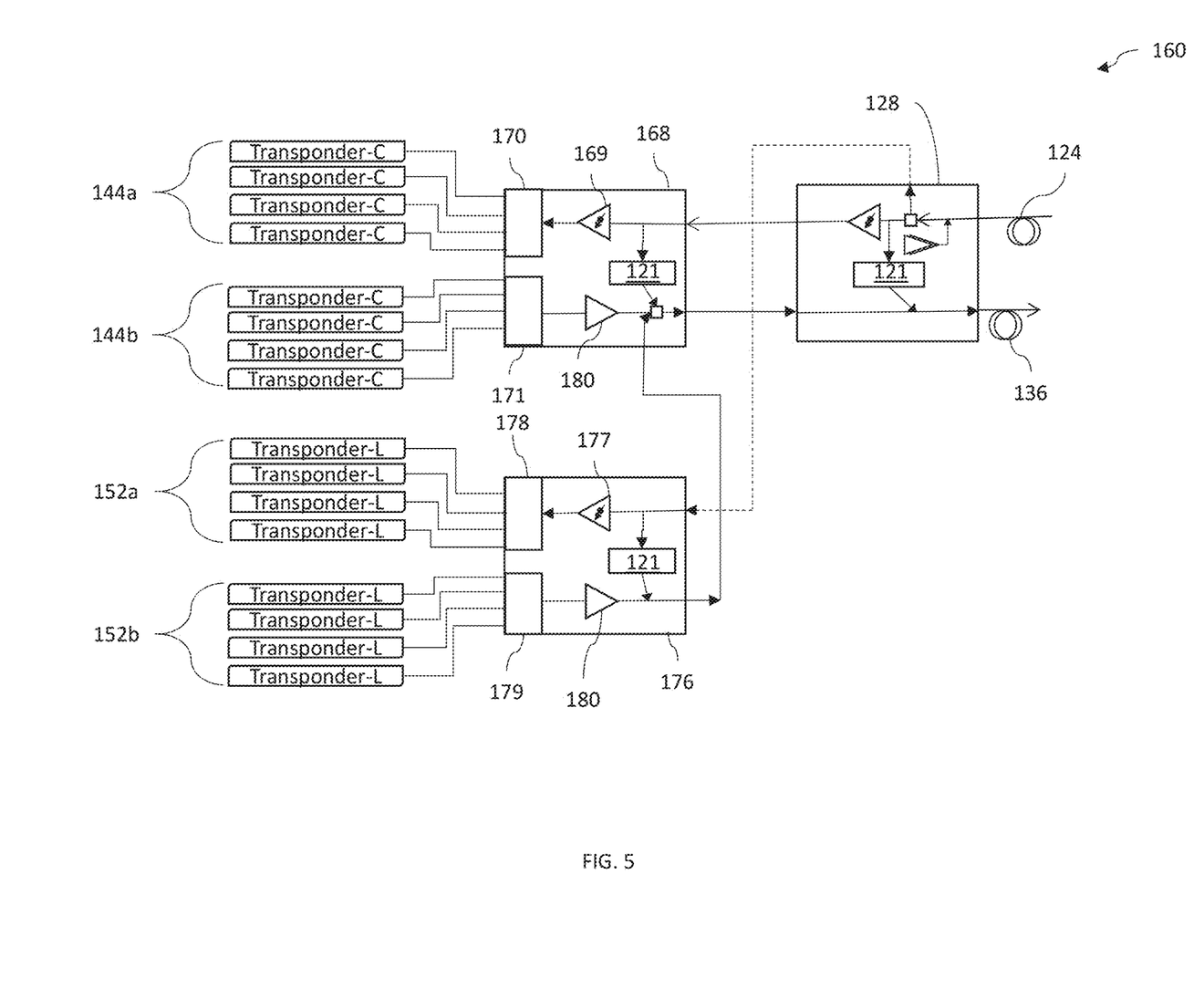
FIG. 5 is a diagram of an exemplary embodiment of a C+L band terminal in an optical network.

Referring now to FIG. 5, shown therein is a C+L Band terminal site 160 having a plurality of C-Band transponders 164 connected to a C-Band ROADM 168 and a plurality of L-Band transponders 172 connected to an L-Band ROADM 176, the C-Band ROADM 168 and the L-Band ROADM 176 are connected together and connected to a hybrid C-Band card 128, the hybrid C-Band card 128 connected to the first fiber optic span 124 having the first transmission signal traveling in the first direction and connected to the second fiber optic span 136 having the second transmission signal traveling in the second direction. Data traveling from the C-Band transponder 164 towards the hybrid C-Band card 128 is multiplexed within the C-Band ROADM 168 and combined with data traveling from the L-Band transponder 172 and multiplexed within the L-Band ROADM 176. The combined data is transmitted from the C-Band ROADM 168, through the hybrid Raman EDFA and transmitted along the second fiber optic span 136. Conversely, data traveling from the first fiber optic span 124 towards the hybrid C-Band card 128 is split by the hybrid Raman EDFA into its C-Band and L-Band components, the C-Band components being sent to the C-Band ROADM 168 wherein the C-Band components are demultiplexed and sent to the plurality of C-Band transponder 164 and the L-Band components being sent to the L-Band ROADM 176 wherein the L-Band components are demultiplexed and sent to the plurality of L-Band transponder 172. In other embodiments, the hybrid C-Band card 128 is a C-Band card 144.

In one embodiment, the local orchestrator 42a is a computer having software stored in non-transitory memory accessible by a processor that causes the processor to perform the controlling operation described above. In one embodiment, the power controller 46a is an element of and contained within the local orchestrator 42a. In one embodiment, the power controller 46a may be an element of the ROADM 62a field replaceable unit (FRU). In another embodiment, the orchestrator 42, loading policy manager 90a, and the power controller 46a may each have a processor and non-transitory computer readable memory, such as a shelf or a chassis controller card, or the processor and non-transitory memory may be shared between one or more of the orchestrator 42a, the loading policy manager 90a, and the power controller 46a. When the power controller 46a is an element of the ROADM 62a FRU, the MUX controller 54a, link controller 58a and DEMUX controller 50a are also elements of the ROADM 62a FRU. In one embodiment, the MUX controller 54a and the link controller 58a are elements of the ROADM 62a FRU and/or are elements of the transmit degree 68a and the DEMUX controller 50a is an element of the receive degree 66a.

Figure 6:
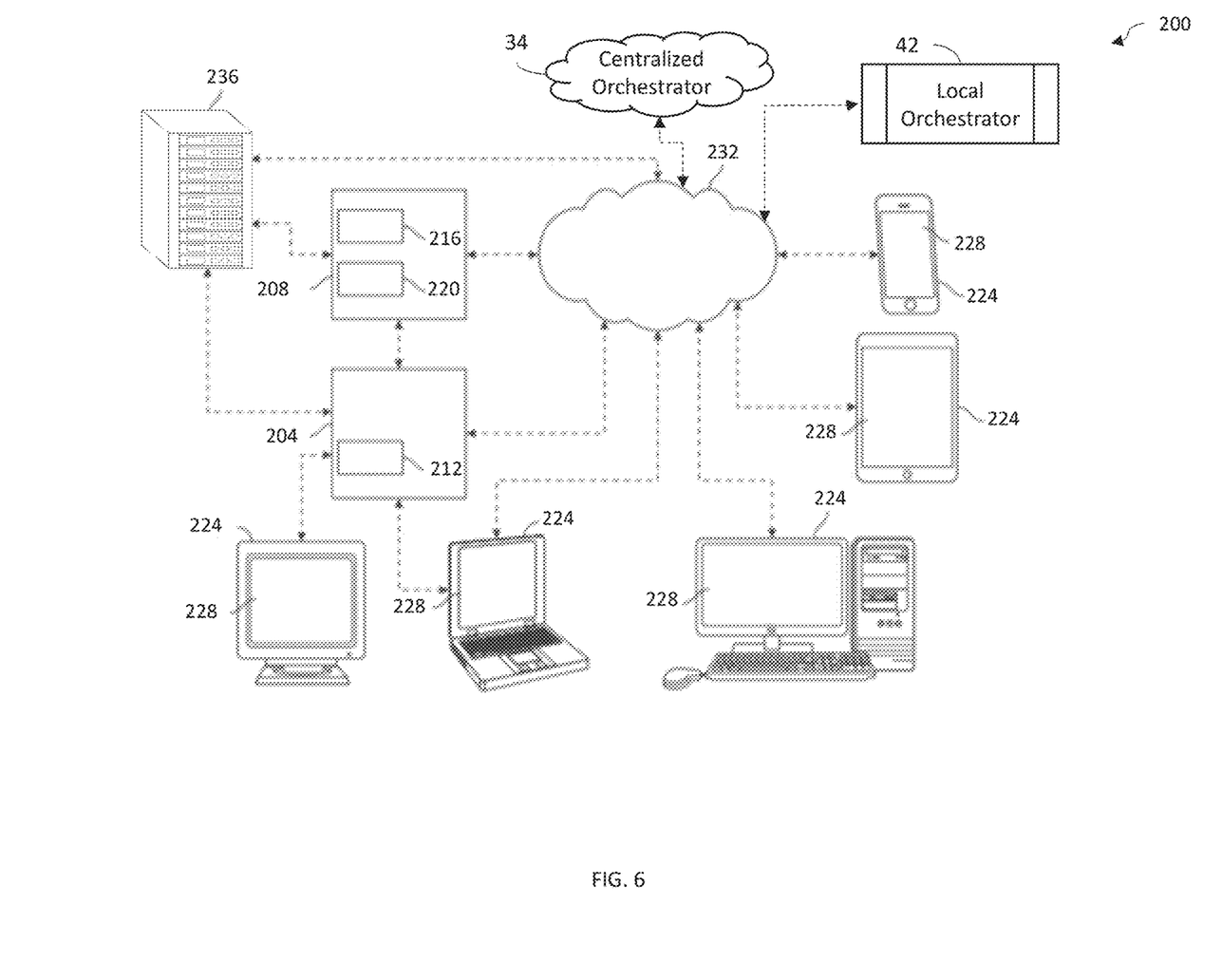
FIG. 6 is a diagram of an exemplary embodiment of a computer system implementing the present disclosure.

Referring now to FIG. 6, shown therein is a computer system 200 in accordance with the present disclosure designed to carry out the optical power control method. The optical power control method may be carried out on one or more computer system 200. The computer system 200 may comprise one or more processor 204, one or more non-transitory computer-readable storage medium 208, and one or more communication component 212. The one or more non-transitory computer-readable storage medium 208 may store one or more database 216 and program logic 220. The one or more database may comprise the policies discussed above and/or other data. The computer system 200 may bi-directionally communicate with a plurality of user devices 224, which may or may not have one or more screens 228, and/or may communicate via a network 232. The processor 204 or multiple processors 204 may or may not necessarily be located in a single physical location.

In one embodiment, the non-transitory computer-readable readable medium 208 stores program logic, for example, a set of instructions capable of being executed by the one or more processor 204, that when executed by the one or more processor 204 causes the one or more processor 204 to carry out the optical power control method.

In one embodiment, the network 232 is the Internet and the user devices 224 interface with the system via the communication component 212 and a series of web pages. It should be noted, however, that the network 232 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer system 200 comprises a server system 236 having multiple servers in a configuration suitable to provide a commercial computer-based business system such as a commercial web-site and/or data center. The server system 236 may be connected to the network 232.

The computer system 200 is in communication with the centralized orchestrator 34 and/or one or more local orchestrator 42. In one embodiment, the computer system 200 is an element of the field replaceable unit, or FRU.

Figure 7A:
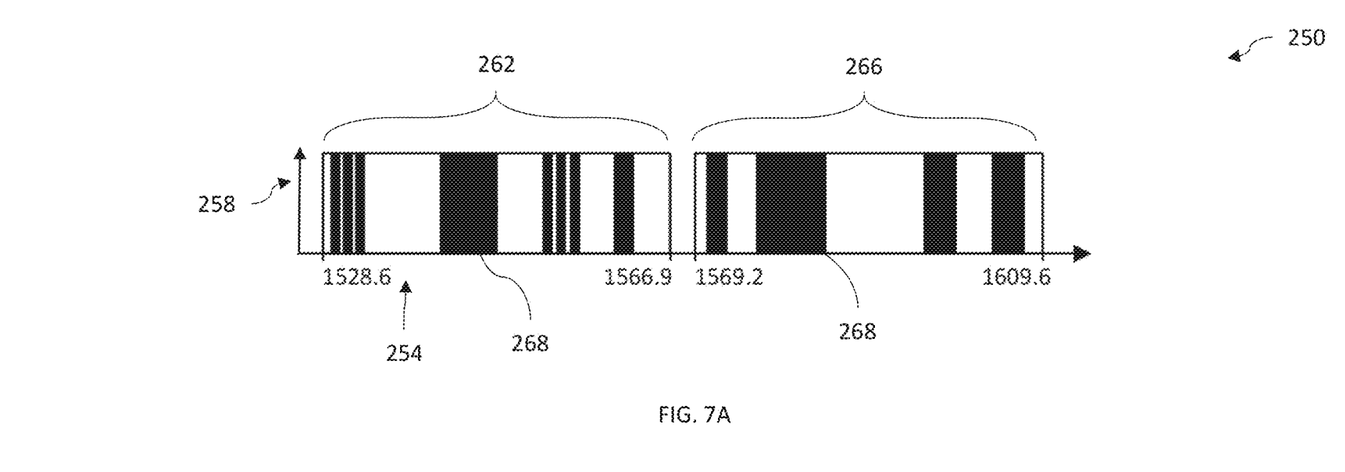
FIG. 7A is an exemplary first graph of wavelength of a signal and power level of the signal at differing wavelengths at a first instance of time.
Figure 7B:
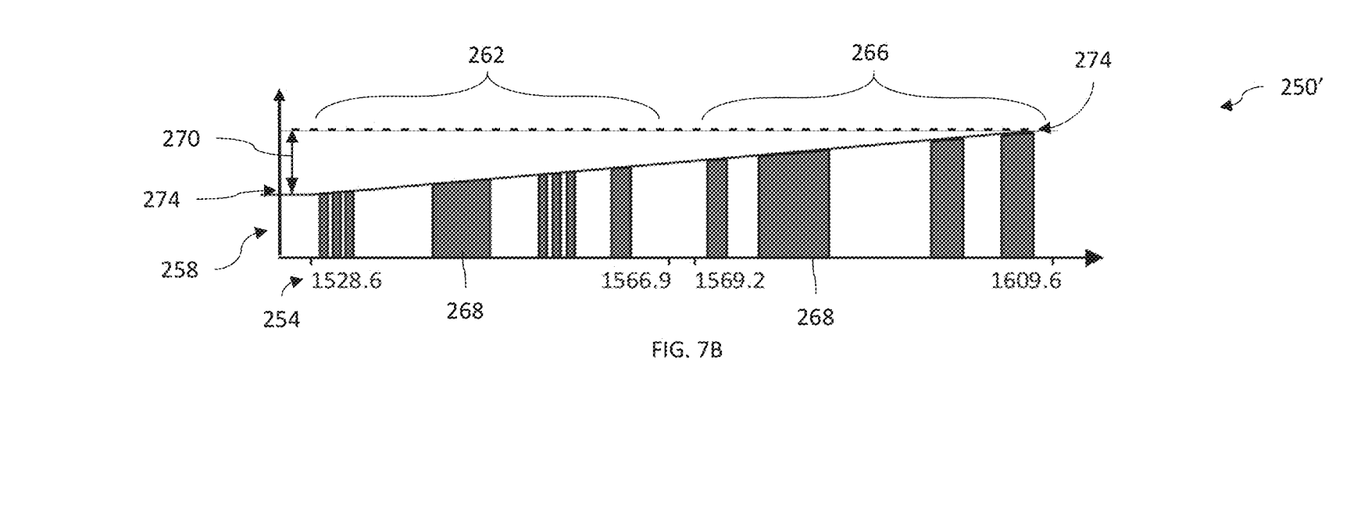
FIG. 7B is an exemplary second graph of wavelength of a signal and power level of the signal at differing wavelengths at a second instance of time.

Referring now to FIG. 7A, shown therein is a first graph 250 having an X-axis 254 depicting wavelength of a signal in nanometers and a Y-axis 258 depicting power level of the signal at differing wavelengths at a first instance in time. The wavelengths along the X-axis 254 are shown shortest to longest from the left to the right and are sectioned into a C-Band 262 and an L-Band 266, each Band 262 and 266 having one or more channel 268. As shown in the first graph 250, the power levels for the C-Band 262 and the L-Band 266 are substantially similar. Referring now to FIG. 7B, shown therein is a second graph 250' having the X-axis 254 depicting wavelength of the signal in nanometers and the Y-axis 258 depicting power level of the signal at differing wavelengths at a second instance in time, the second instance in time being after the first instance in time. The wavelength along the X-axis 254 are shown shortest to longest from the left to the right and are sectioned into a C-Band 262 and an L-Band 266, each Band 262 and 266 having one or more channel 268. As shown in the second graph 250', the power levels for the C-Band 262 and the L-Band 266 have a linear tilt slope 270. The linear tilt slope 270 is a slope, in dB/THz, of the power level of the signal from a lowest power level 274 at the shortest wavelength in the C-Band 262 and a highest power level 274 at the longest wavelength in the L-Band 266.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. An optical network, comprising:
   a fiber optic line;
   an optical add drop multiplexer having a first amplifier for amplifying first optical signals within an L-Band, and a second amplifier for amplifying second optical signals within a C-Band, the first amplifier coupled to the fiber optic line to provide the first optical signals into the fiber optic line, the second amplifier being coupled to the fiber optic line to provide the second optical signals into the fiber optic line; and
   an orchestrator having a processor receiving a list of operations to execute, the operations being to activate or deactivate one or more service within the first optical signal or the second optical signal, the processor retrieving network status data for the fiber optic line, and analyzing the list of operations with the network status data including existing data traffic on the fiber optic line to select a subset of the list of operations to execute that maintains the first optical signal and the second optical signal below a bit error rate threshold, the processor issuing one or more signals, to cause the one or more service within the subset of the list of operations to be activated or deactivated on the fiber optic line.

2. The optical network of claim 1 further comprising a power controller having a processor and calculating first power and first tilt settings for the first amplifier, and second power and second tilt settings for the second amplifier, a first gain setting, the first tilt setting, a second gain setting and the second tilt setting being configured to maintain the first optical signal and the second optical signal within a Q margin range.

3. The optical network of claim 2, wherein the power controller causes the first amplifier to be configured with the first gain setting and the first tilt setting, and causes the second amplifier to be configured with the second gain setting and the second tilt setting.

4. The optical network of claim 2 further comprising a link controller, the link controller configuring the first amplifier with the first gain setting and the first tilt setting, and configuring the second amplifier with the second gain setting and the second tilt setting.

5. The optical network of claim 1 further comprising a power controller receiving the one or more signals and configuring the first amplifier and the second amplifier to activate or deactivate one or more service on the fiber optic line based in part on the subset of the list of operations to be activated or deactivated on the fiber optic line.

6. The optical network of claim 1 further comprising a mux controller receiving the one or more signals and wherein the mux controller causes the optical add drop multiplexer to activate or deactivate one or more service within the subset of the list of operations to be activated or deactivated on the fiber optic line.

7. The optical network of claim 1, wherein the fiber optic line is a first fiber optic line, the optical add-drop multiplexer is a first optical add-drop multiplexer, and the orchestrator is a first orchestrator, further comprising a second fiber optic line, the second fiber optic line and the first fiber optic line forming a transmission line, a second optical add-drop multiplexer, the second optical add-drop multiplexer being coupled to the first fiber optic line and the second fiber optic line, the first orchestrator configured to communicate the network status data to the second orchestrator.

8. The optical network of claim 7 further comprising a third orchestrator, the third orchestrator communicably coupled to both the first orchestrator and the second orchestrator, the first orchestrator configured to communicate the network status data to the third orchestrator, the third orchestrator configured to transmit the network status data to the second orchestrator.

9. The optical network of claim 8, wherein the third orchestrator is further configured to analyze the network status data and transmit, to the second orchestrator, any network status data that may affect the second fiber optic line.

10. The optical network of claim 7, wherein the first optical signals and the second optical signals travel in a first direction, the first direction being from the first optical add-drop multiplexer at a first instance in time to the second optical add-drop multiplexer at a second instance in time, the second instance in time being after the first instance in time, wherein causing the one or more service within the subset of the list of operations to be activated includes first causing the one or more service within the subset of the list of operations to be activated at the first optical add-drop multiplexer then causing the one or more service within the subset of the list of operations to be activated at the second optical add-drop multiplexer, and wherein causing the one or more service within the subset of the list of operations to be deactivated includes first causing the one or more service within the subset of the list of operations to be deactivated at the second optical add-drop multiplexer and then causing the one or more service within the subset of the list of operations to be deactivated at the first optical add-drop multiplexer.

11. The optical network of claim 1, wherein the processor further calculates first power and first tilt settings for the first amplifier and second power and second tilt settings for the second amplifier, a first gain setting, the first tilt setting, a gain power setting and the second tilt setting being configured to maintain the first optical signal and the second optical signal within Q margin range, and configures the first amplifier with the first gain setting and the first tilt setting, and configuring the second amplifier with a second gain setting and the second tilt setting.

12. The optical network of claim 1, wherein the operation to execute is received from a user interface.

13. The optical network of claim 1, wherein the network status data comprises fiber type, launch power, transmission signal power, spectral loading, fiber length, equipment topology, active services, and carrier locations.

14. The optical network of claim 1, wherein a Q margin range is greater than 0 dB and less than or equal to 1.0 dB with full loading.

15. The optical network of claim 1, wherein the optical communication system is a wavelength division multiplexed optical communication system.

16. The optical network of claim 1, wherein the reconfigurable add drop multiplexer is a first reconfigurable add drop multiplexer, and further comprising a second reconfigurable add drop multiplexer coupled to the fiber optic line.

17. The optical network of claim 16, wherein the fiber optic line has two or more spans, each span connected by an optical in-line amplifier, and the power controller implementing tilt compensation and gain compensation at each optical in-line amplifier.

* * * * *